US006754387B1

(12) United States Patent
Bera

(10) Patent No.: US 6,754,387 B1
(45) Date of Patent: Jun. 22, 2004

(54) SYSTEMS, METHOD AND PROGRAM PRODUCT FOR PATTERN INFORMATION PROCESSING

(75) Inventor: Rajendra Kumar Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 09/666,689

(22) Filed: Sep. 21, 2000

(51) Int. Cl.$^7$ .............................................. G06K 9/00
(52) U.S. Cl. ..................... 382/181; 382/199; 382/241
(58) Field of Search ................................ 382/181, 195, 382/197, 199, 203, 205, 209, 218, 241

(56) References Cited

U.S. PATENT DOCUMENTS

| | | | | |
|---|---|---|---|---|
| 4,573,197 A | * | 2/1986 | Crimmins .................... | 382/197 |
| 4,783,829 A | * | 11/1988 | Miyakawa et al. .......... | 382/199 |
| 4,845,764 A | * | 7/1989 | Ueda et al. ................... | 382/146 |
| 5,319,744 A | * | 6/1994 | Kelly et al. ................... | 345/647 |
| 5,475,766 A | * | 12/1995 | Tsuchiya et al. ............. | 382/144 |
| 5,559,901 A | * | 9/1996 | Lobregt ........................ | 382/256 |
| 5,649,028 A | * | 7/1997 | Hollinger ..................... | 382/199 |

\* cited by examiner

Primary Examiner—Daniel Mariam

(74) Attorney, Agent, or Firm—Manny Schecter; To Rao Coca; Anthony V S England

(57) ABSTRACT

A method for processing information about a polygonal pattern in the context of pattern recognition in a computer environment, the method comprising the steps of:

(a) taking the corners of the pattern in turn in order from a first of the corners through the last of the corners, forming a first ordered sequence M of values representing the respective scalar distances between each corner of the polygonal pattern and each other corner, the sequence including (i) the distances between said first of said corners and each other corner in turn and (ii) taking each other corner in turn, the distances between that other corner and each other corner starting with the said first corner, and (iii) including at appropriate positions in the sequence zero values to correspond to the distance between each corner and itself;

(b) re-ordering the values of said first sequence M to form a second ordered sequence $P_1$ comprising a set of values $p_1$ which includes for each corner starting with said first corner, values in a series starting with and including the said zero value for that corner and including the other values for that corner in one direction through, the order in which they appear in said first sequence; and (c) converting said values in the second ordered sequence $P_1$ to respective equal-length character strings representative of the values.

30 Claims, 3 Drawing Sheets

SYSTEMS, METHOD AND PROGRAM PRODUCT FOR PATTERN INFORMATION PROCESSING

BACKGROUND OF THE INVENTION

1. Field of the Invention

The invention relates to a system, method and program product for pattern information processing, more particularly in the context of pattern recognition.

Pattern recognition of geometrical objects has been an important topic in artificial intelligence. An important application is in robotics where a robot is required, in certain tasks, to detect objects of given geometrical shapes.

The term "program product" here means a body of computer code stored by a machine readable storage medium such as a CD-ROM or one or more floppy discs, or made available for downloading from a remote computer site. The computer code may be integrated within a pattern recognition program or artificial intelligence program especially, but not exclusively, in the context of robotics.

One object of the invention is to provide a relatively simple means of deciding if two geometrical objects, each of polygonal shape, are similar, that is, they are geometrically identical except possibly for their size.

SUMMARY OF THE INVENTION

The invention comprises a method, system and program product for processing information about a polygonal pattern in the context of pattern recognition in a computer environment. In the invention, a polygonal pattern is analysed. Taking the corners of the pattern in turn in order from a first of the corners through the last of the corners, a first ordered sequence M of values representing the respective scalar distances between each corner of the polygonal pattern and each other corner is formed. The sequence includes (i) the distances between the first of said corners and each other corner in turn and (ii) taking each other corner in turn, the distances between that other corner and each other corner starting with the said first corner, and (iii) including at appropriate positions in the sequence zero values to correspond to the distance between each corner and itself.

The values in the first sequence are then re-ordered to form a second ordered sequence $P_1$ comprising a set of values $p_1$ which includes, for each corner starting with said first corner, values in a series starting with and including the said zero value for that corner and including the other values for that corner in one direction through, the order in which they appear in said first sequence. The values in the second sequence $P_1$ are then converted to respective equal-length character strings representative of the values.

The second ordered sequence $P_1$ may include said set of values $p_1$ twice in succession for the sequence $P_1$ to comprise $p_1$ $p_1$.

Advantageously, the values of said first sequence M are also re-ordered to form a third ordered sequence $P_2$ comprising a set of values $p_2$ which includes, for each corner starting with the said last corner, values in a series starting with and including the said zero value for that corner and including the other values for that corner in the direction opposite to said one direction through the order in which they appear in said first sequence. Meanwhile, in this advantageous embodiment, the values in the third ordered sequence $P_2$ are converted to respective equal-length character strings representative of the values.

The third ordered sequence $P_2$ may include said set of values $P_2$ twice in succession for the sequence $P_2$ to comprise $p_2$ $p_2$.

The values in the second sequence $P_1$ and/or the third sequence $P_2$ can be converted to exponential notation.

Ideally, the values in the first sequence are normalised by dividing each value by the largest value in the sequence prior to normalization.

The first sequence M can be stored and processed as a matrix.

The invention may comprise or be operable for forming values in respect of first polygonal patterns, and comparing the said converted values relating to the first pattern with the converted values relating to the second pattern by way of a computer-coded string-comparison command.

Also, the invention may comprise or be operable for comparing said converted values for said first pattern with predetermined values representative of a selection of further patterns by way of a computer coded string search command.

DESCRIPTION OF THE DRAWINGS

Embodiments of the present invention will be described by reference to the accompanying drawings. In these drawings.

DETAILED DESCRIPTION

Figure 1:
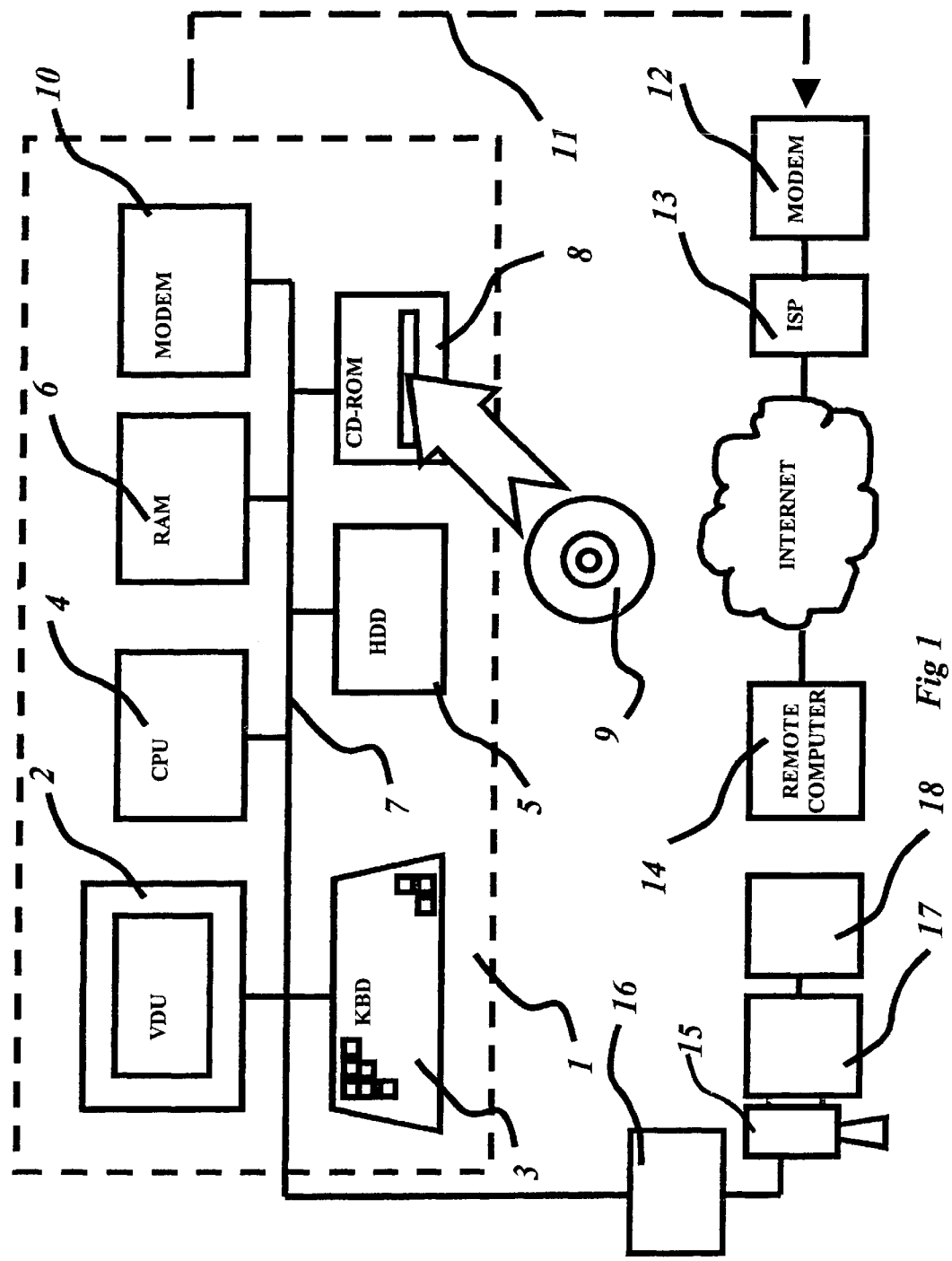
FIG. 1 is a block diagram of an exemplary computer environment.

FIG. 1 shows one embodiment of a computing environment in which the method of the present invention may be carried out and implementations of the system and program product of the invention.

This embodiment comprises a so-called stand alone computer 1, ie one which is not permanently linked to a network, including a display monitor 2, a keyboard 3, a microprocessor—based central processing unit 4, a hard-disc drive 5 and a random access memory 6 all coupled one to another by a connection bus 7. The keyboard 3 is operable for enabling the user to enter commands into the computer along with user data. As well as keyboard 3, the computer may comprise a mouse or tracker ball (not shown) for entering user commands especially if the computer is controlled by an operating system with a graphical user interface.

To introduce program instructions into the computer 1, ie to load them into the memory 6 and/or store them onto the disc drive 5 so that the computer begins to operate, and/or is made able to operate when commanded, in accordance with the present invention the computer 1 comprises a CD-ROM drive 8 for receiving a CD-ROM 9.

The program instructions are stored on the CD-ROM 9 from which they are read by the drive 8. However, as will be well understood by those skilled in the art, the instructions as read by the drive 8 may not be usable directly from the CD-ROM 9 but rather may be loaded into the memory 6 and stored in the hard-disc drive 5 and used by the computer 1 from there. Also, the instructions may need to be decompressed from the CD-ROM using appropriate decompression software on the CD-ROM or in the memory 6 and may, in any case, be received and stored by the computer 1 in a sequence different to that in which they are stored on the CD-ROM.

In addition to the CD-ROM drive 8, or instead of it, any other suitable input means could be provided, for example a floppy-disc drive or a tape drive or a wireless communication device, such as an infrared receiver (none of these devices being shown).

The computer 1 also comprises a telephone modem 10 through which the computer is able temporarily to link up to the Internet via telephone line 11, a modem 12 located at the premises of an Internet service provider (ISP), and the ISP's computer 13.

Thus, a program product according to this invention may comprise a storage medium such as the CD-ROM 9 this having stored a body of computer code for causing the computer 1 to carry out the inventive method. Alternatively, the program product may be implemented as a body of computer code made available for downloading to computer 1 from a computer 14 by a supplier operating or using that computer.

Also linked to the computer bus 7 is a combination of a TV camera 15 and video signal to digital data conversion apparatus 16. The camera 15 and apparatus 16 could be part of robotic apparatus 17. In fact, an alternative embodiment of the computer environment could comprise the computer system 18 of the robotic apparatus 17.

The computer 1 does not have to be in a stand alone environment. Instead, it could form part of a network (not shown) along with other computers to which it is connected on a permanent basis. It could also be permanently coupled to or have a temporary link to a so-called Intranet, ie a group of data holding sites similar to Internet sites or URL's and arranged in the same way as the Internet but accessible only to particular users, for example the employees of a particular company. Instead of modem 10, the computer 1 could have a digital hard-wired link to the ISP's computer 13 or the computer 1 could itself comprise a permanently connected Internet site (URL) whether or not acting as an ISP for other remote users. In other words, instead of the invention being usable only through the local keyboard 3, it may also be available'to remote users working through temporary or permanent links to computer 1 acting as ISP or simply as an Internet site.

Polygonal patterns to be recognised or compared are viewed via the camera 15. Alternatively, the patterns may be passed to the computer by other means, for example by a drawing program or as a data entered via the keyboard or via a scanner (not shown). The patterns may be in the form of data stored on the hard-disc drive 5 or on another CD-ROM entered in the drive 8, assuming the drive and the other CD-ROM are capable of re-writing data to the CD-ROM, or on the aforementioned optional floppy disc-disc or tape drive, or on a file server (not shown) forming part of the aforementioned network, or from storage sites within the Internet or the aforementioned Intranet.

Figure 2:
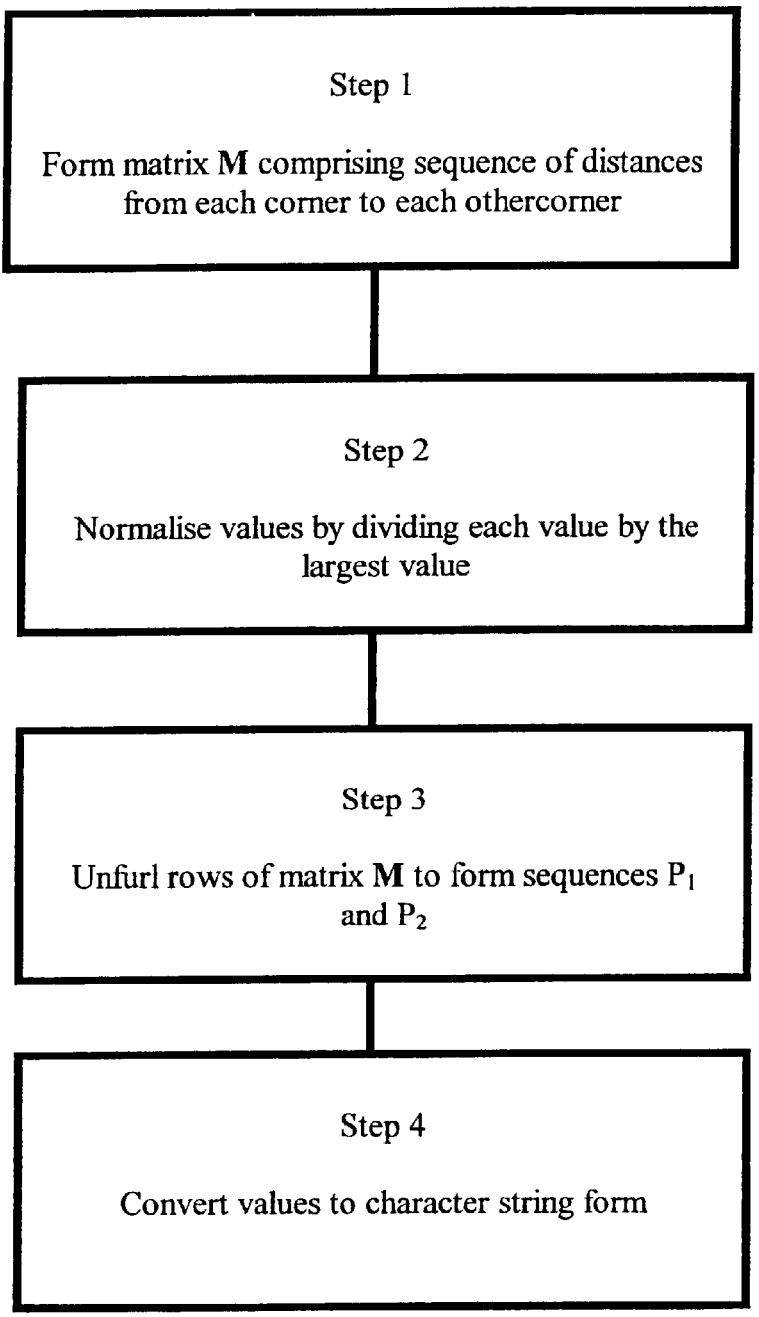
FIG. 2 is a flow chart for explaining a method in accordance with this invention.

The pattern recognition method will now be described firstly generally and then as a specific algorithm but, in either case, in the form of comments plus some pseudo-code and/or C/C++ language statements. It will be appreciated however that the use of C/C++ language statements is not intended to limit the scope of the invention to that language since the algorithm is readily transferable to other computer languages. The numbered steps referred to below correspond to the steps of the flow chart of FIG. 2.

Given two objects of polygonal shapes represented, in a cyclic fashion, by the co-ordinates of its corners, the algorithm determines if they are geometrically similar. It is useful to allow the user the freedom to represent each object in a co-ordinate system of its own, and the cyclic sequence (clockwise or anti-clockwise) in which the corner co-ordinates of the polygon are stated.

Thus, there are four sections of the algorithm:

1. Representation of the object (input data);
2. Scale of the object;
3. Orientation of the object;
4. Means of comparing two objects.

Step 1—Representation of the Object

Independence from the co-ordinate system is achieved by representing the object in terms of the lengths (in suitable units) between two corners of the polygon. The length being a scalar quantity, independence from co-ordinate systems follows. Let P be a polygon of n-sides with its n-corners sequentially numbered (either clockwise or anti-clockwise) from 1 to n. Also, let the co-ordinates of the corners be given by the tuple $(s_i,t_i)$ for the i-th corner in some co-ordinate system (not necessarily Cartesian). From the given co-ordinates create the length matrix M whose elements $M_{ij}$ represent the length between the corners i and j. Clearly M is a symmetric matrix since $M_{ij}=M_{ji}$. Also, $M_{ij}=0$ when i=j, while all the other elements are non-zero and positive. Thus, M has the structure $$M = \begin{bmatrix} O & M_{12} & M_{13} & \ldots & \ldots & M_{1n} \\ M_{21} & O & M_{23} & \ldots & \ldots & M_{2n} \\ \ldots & \ldots & \ldots & \ldots & \ldots & \ldots \\ M_{n1} & M_{n2} & M_{n3} & \ldots & M_{n,n-1} & O \end{bmatrix}$$

No two objects, unless they are identical in shape and size, will have identical Ms.

Step 2—Scale of the Object

Scale independence is achieved by normalising M, that is, dividing each element $M_{ij}$ by the maximum element (scale factor) in M. Henceforth, unless otherwise stated, M is assumed to be in its normalised form.

Step 3—Orientation of the Object

For the object P consider the sequence $p_1 \equiv OM_{12}M_{13} \ldots M_{1n}OM_{23} \ldots M_{2n}M_{21} \ldots OM_{i,i+1}M_{i,i+2} \ldots M_{i,n}M_{i1}M_{i2} \ldots M_{i,i-1} \ldots OM_{n1}M_{n-2} \ldots M_{n,n-1}$, which has been obtained by unfurling to the right each row (beginning with the first row, and down to the last row) of M from its diagonal element (zero value), and $p_2 \equiv OM_{n,n-1}M_{n,n-2} \ldots M_{n1}OM_{n-1,n-2}M_{n-1,n-3} \ldots M_{n-1,1}M_{n-n} \ldots OM_{i,i-1}M_{i,i-2} \ldots M_{i1}M_{i,n}M_{i,n-1} \ldots M_{i,i+1} \ldots OM_{1n}M_{1,n-1} \ldots M_{13}M_{12}$.

which has been obtained by unfurling to the left each row (beginning with the last row, and up to the first row) of M from its diagonal element.

The significant of the sequence, say, $p_1$, is that each set of n elements, beginning with a 0, represents the sequence of lengths measured cyclically from i to j=i, i+1, i+2, ..., n, 1, 2, ..., i−1. On the other hand $p_2$ represents the sequence of lengths measured cyclically from i to j=i, i−1, i−2, ... 2, 1, n, n−1, n−2, ..., i+1. Notice that if $p_1$ implies clockwise traversing then $p_2$ implies anti-clockwise traversing, and vice-versa.

From $p_1$ we create the new sequence $P_1$, which is $p_1p_1$, that is, $P_1 \equiv OM_{12}M_{13} \ldots M_{1n}OM_{23} \ldots M_{2n}M_{21} \ldots OM_{i,i+1}M_{i,i+2} \ldots M_{i,n}M_{i1}M_{i2} \ldots M_{i,i-1} \ldots OM_{n1}M_{n2} \ldots$ $M_{n,n-1} O M_{12} M_{13} \ldots M_{1n} O M_{23} \ldots M_{2n} M_{21} \ldots$
$O M_{i,i+1} M_{i,i+2} \ldots M_{i,n} M_{i1} M_{i2} \ldots M_{i,i-1} \ldots O M_{n1}$
$M_{n2} \ldots M_{n,n-1}$.

This will capture all permissible sequences of length measurements for the particular cyclic direction chosen for $p_1$. Likewise, from $p_2$ we create the new sequence $P_2$, which is $p_2 p_2$, that is, $P_2 \equiv O M_{n,n-1} M_{n,n-2} \ldots M_{n1} O M_{n-1,n-2} M_{n-1,n-3} \ldots$
$M_{n-1,1} M_{n-1,n} \ldots O M_{i,i-1} M_{i,i-2} \ldots M_{i1} M_{i,n} M_{i,n-1} \ldots$
$M_{i,i+1} \ldots O M_{1n} M_{1,n-1} \ldots M_{13} M_{12} O M_{n,n-1} M_{n,n-2} \ldots$
$M_{n1} O M_{n-1,n-2} M_{n-1,n-3} \ldots M_{n-1,1} M_{n-1,n} \ldots$
$O M_{i,i-1} M_{i,i-2} \ldots M_{i1} M_{i,n} M_{i,n-1} \ldots M_{i,i+1} \ldots$
$O M_{1n} M_{1,n-1} \ldots M_{13 \ M12}$ Between $P_1$ and $P_2$ all permissible sequences of length measurements are thus captured. That is, no matter. from which corner of the polygon one begins the length measurements, and whether the measurements are made clockwise or anti-clockwise, that sequence of measurements will be found as a sub-sequence in $P_1$ or $P_2$ at least once (more number of times if there are symmetries in the polygon). This achieves orientation independence.

Step 4—Means of Comparing Two Objects

The sequence $P_1$ and $P_2$ are put into a character string form by representing the numerical value of each $M_{ij}$ in an exponential notation (such as in e-format in C or C++) as follows:

".[unsigned number]e[e-sign][unsigned exponent]"

where [unsigned number] is an r-digit number comprising digits and r is a predefined integer greater than 0, [e-sign] is the sign of the exponent and is one of + (plus) or − (minus), [unsigned exponent] is an m-digit number comprising only digits and m is a predefined integer greater than 0. Note that there is a decimal point before the [unsigned number] and an e separating [unsigned number] and [e-sign]. In this format, all the constituent parts of a constant must be represented. Thus:

$25 = 0.25 * 10^2$ becomes $0.250000e+02$ and $0.025 = 0.25 * 10^{-1}$ becomes $0.250000e-01$ where we have assumed r=6 and m=2. Note that any constant will be represented by a string of constant length m+r+3 characters in the e-format. Here e[e-sign][unsigned exponent] represents the quantity 10 raised to the power[e-sign][unsigned exponent], which must be multiplied to the number represented by [unsigned number] to get the actual constant.

Now given two objects, P and Q, we construct for one of them, say P, the sequences $P_1$ and $P_2$ and for the other (that is, Q) the sequence q, which is either $q_1$ or $q_2$. If q turns out to be a substring of $P_1$ or $P_2$, then P and Q are geometrically similar, otherwise not.

The string representation allows various types of information about the object or its geometry to be deduced or generated. Some of these are listed below.

Symmetries

If an object's geometry has symmetries, this will be reflected in the number of substrings (each beginning with a 0 followed by n31 1 row elements of M), which turn out to be identical in either $P_1$ or $P_2$. For example, for a regular polygon, all the 2n-substrings (each beginning with a 0 and ending immediately before the next 0) in $P_1$ or $P_2$ will be identical.

Approximate matching

Measurements (and calculations) are not always precise to the level desired. A simple means of handling such situations is to express the character strings $P_1$, $P_2$, and q, with lesser precision, that is, choose suitably smaller values for r (commensurate with the precision of measurement and/or calculation) when representing the elements of M in the exponential notation before carrying out any matching tests.

Matching against reference objects

If we are given a set of reference objects and the task is to find if objects in a second set belong to the reference set or not, then for the reference set we prepare the $P_1$, $P_2$ strings for each of its objects, and for the second set the q strings for each of its representative objects. For each object in the second set we compare its q with the $P_1$, $P_2$ strings of each object in the reference set till a match is found or the set is exhausted.

Identification of objects

Given a catalogue of shapes for each of which the strings $P_1$ and $P_2$ have been prepared (preferably with high precision so that lower precision strings can be easily derived from them, if required), the method outlined above can be used to determine if a given geometrical shape is one from the catalogue. Such identification means would be an important step in developing automated schemes for proving theorems in geometry using heuristics in an expert system. An extensive catalogue of geometrical shapes represented in string form would, in itself, serve as an important database.

Figure 3:
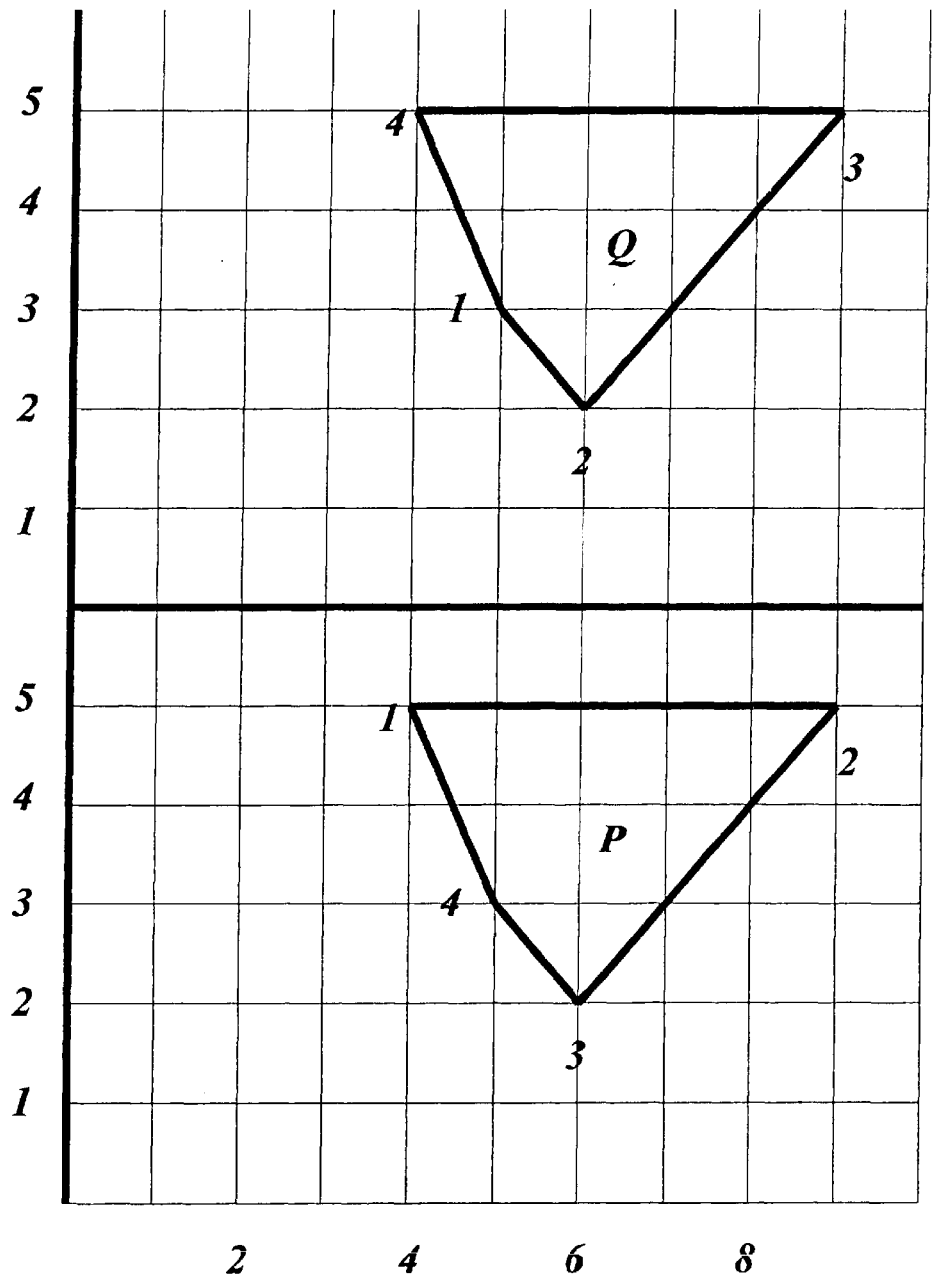
FIG. 3 is a diagram showing two polygons for assisting in the explanation of an example of the FIG. 2 method.

A worked example will now be given with reference to FIG. 3. Consider two polygons P and Q. Let P be given by the set of co-ordinates $\{(4,5), (9,5), (6,2), (5,3)\}$ and Q by the set of co-ordinates $\{(5,3), (6,2), (9,5), (4,5)\}$. The construction of the normalised matrix M for P provides the following:

$$M = \begin{vmatrix} .000000e+00 & .100000e+01 & .721110e.00 & .447214e+00 \\ .100000e+01 & .000000e+00 & .848528e+00 & .894427e+00 \\ .721110e+00 & .848528e+00 & .000000e+00 & .282843e+00 \\ .447214e+00 & .894427e+00 & .282843e+00 & .000000e+00 \end{vmatrix}$$

from which we construct $P_1$ and $P_2$, which are given below:

$P_1$: 0.000000e+00.100000e+01.721110e+00.447214e+
00.000000e+00.848528e+00.894427e+00.100000e+
01.000000e+00.282843e+00.72111e+00.848528e+
00.000000e+00.447214e+00.894427e+00.282843e+
00.000000e+00.100000e+01.721110e+00.447214e+
00.000000e+00.848528e+00.894427e+00.100000e+
01.000000e+00.282843e+00.721110e+00.848528e+
00.000000e+00.447214e+00.894427e+00.282843e+00

$P_2$: 0.000000e+00.282843e+00.894427e+00.447214e+
00.000000e+00.848528e+00.721110e+00.282843e+
00.000000e+00.100000e+01.894427e+00.848528e+
00.000000e+00.447214e+00.721110e+00.100000e+
01.000000e+00.282843e+00.894427e+00.447214e+
00.000000e+00.848528e+00.721110e+00.282843e+
00.000000e+00.100000e+01.894427e+00.848528e+
00.000000e+00.447214e+00.721110e+00.100000+01

The normalised matrix M for Q is $$M = \begin{bmatrix} .000000e+00 & .282843e+00 & .894427e+00 & .447214e+00 \\ .282843e+00 & .000000e+00 & .848528e+00 & .721110e+00 \\ .894427e+00 & .848528e+00 & .000000e+00 & .100000e+01 \\ .447214e+00 & .721110e+00 & .100000e+01 & .000000e+00 \end{bmatrix}$$

from which we construct q to be 0.000000e+00.282843e+00.894427e+00.447214e+
00.000000e+00.848528e+00.721110e+00.282843e+
00.000000e+00.100000e+0.1894427e+00.848528e+
00.000000e+00.447214e+00.721110e+00.100000e+01

This shows up as the underlined substring in $P_2$:

0.000000e+00.282843e+00.894427e+00.447214e+
00.000000e+00.848528e+00.721110e+00.282843e+
00.000000e+00.100000e+01.894427e+00.848528e+
00.000000e+00.447214e+00.721110e+00.100000e+
01.000000 e+00.282843e+00.894427e+00.447214e+
00.000000e+00.848528e+00.721110e+00.282843e+
00.000000e+00.100000e+01.894427e+00.848528e+
00.000000e+00.447214e+00.721110e+00.100000e+01 thereby confirming that P and Q are geometrically similar.

Had Q been described by the set of co-ordinates {(6,2), (9,5), (4,5), (5,3)} the normalised matrix M would have been $$M = \begin{bmatrix} .000000e+00 & .848528e+00 & .721110e+00 & .282843e+00 \\ .848528e+00 & .000000e+00 & .100000e+01 & .894427e+00 \\ .721110e+00 & .100000e+01 & .000000e+00 & .447214e+00 \\ .282843e+00 & .894427e+00 & .447214e+00 & .000000e+00 \end{bmatrix}$$

for which its q would be given by 0.000000e+00.848528e+00.721110e+00.282843e+
00.000000e+00.100000e+01.894427e+00.848528e+
00.000000e+00.447214e+00.721110e+00.100000e+
01.000000e+00.282843e+00.894427e+00.447214e+00

Again, as expected this shows up as a substring in $P_2$, as underlined below:

0.000000e+00.282843e+00.894427e+00.447214e+
00.000000e+00.848528e+00.72111e+00.282843e+
00.000000e+00.100000e+01.894427e+00.848528e+
00.000000e+00.447214e+00.721110e+00.100000e+
01.000000e+00.282843e+00.894427e+00.447214e+
00.000000e+00.848528e+00.721110e+00.282843e+
00.000000e+00.100000e+01.894427e+00.848528e+
00.00000e+00.447214e+00.721110e+00.100000e+01

In yet another variation, had Q been described by the set of co-ordinates {(9,5), (6,2), (5,3), (4,5)} the normalised matrix M would have been $$M = \begin{bmatrix} .000000e+00 & .848528e+00 & .894427e+00 & .100000e+01 \\ .848528e+00 & .000000e.00 & .282843e+00 & .721110e+00 \\ .894427e+00 & .282843e+00 & .000000e+00 & .447214e+00 \\ .100000e+01 & .721110e+00 & .447214e+00 & .000000e+00 \end{bmatrix}$$

for which the q is given by 0.000000e+00.848528e+00.894427e+00.1000000e+
00.282843e+00.721110e+00.848528e+00.000000e+
00.447214e+00.894427e+00.282843e+00.000000e+
00.100000e+01.721110e+00.447214e+00

Once again, this shows up as a substring, but now, in $P_1$ as underlined below:

0.00000e+00.100000e+01.721110e+00.447214e+
00.000000e+00.848528e+00.894427e+00.100000e+
01.000000e+00.282843e+00.721110e+00.848528e+
00.000000e+00.44714e+00.894427e+00.282843e+
00.000000e+00.100000e+01.721110e+00.447214e+
00.000000e+00.848528e+00.894427e+00.100000e+
01.00000e+00.282843e+00.721110e+00.848528e+
00.000000e+00.447214e+00.894427e+00.282843e+00

The embodiment described and illustrated provides a simple and yet powerful algorithm for comparing geometrical patterns where the comparison is done through the matching of character strings.

However, whilst particular preferred embodiments of the invention have been shown and described herein by way of example, it will be understood by persons skilled in the art that modifications, developments and other changes in form and detail may be made without departing from the spirit and scope of the invention as defined in the appended claims and equivalents thereof.

What is claimed is:

1. A method for processing information about a polygonal pattern in the context of pattern recognition in a computer environment, the method comprising the steps of:

(a) taking the corners of the pattern in turn in order from a first of the corners through the last of the corners, forming a first ordered sequence M of values representing the respective scalar distances between each corner of the polygonal pattern and each other corner, the sequence including (i) the distances between said first of said corners and each other corner in turn and (ii) taking each other corner in turn, the distances between that other corner and each other corner starting with the first corner, and (iii) including at appropriate positions in the sequence zero values to correspond to the distance between each corner and itself;

(b) re-ordering the values of said first sequence M to form a second ordered sequence $P_1$ comprising a set of values p, which includes for each corner starting with said first corner, values in a series starting with and including the zero value for that corner and including the other values for that corner in one direction through, the order in which they appear in said first sequence; and (c) converting said values in the second ordered sequence $P_1$ to respective equal-length character strings representative of the values.

2. A method according to claim 1, wherein said step (b) comprises forming said second ordered sequence $P_1$ to include said set of values $p_1$ twice in succession for the sequence $P_1$ to comprise $p_1p_1$.

3. A method according to claim 1, including the steps of:

(d) re-ordering the values of said first sequence M to form a third ordered sequence $P_2$ comprising a set of values $p_2$ which includes, for each corner starting with the last corner, values in a series starting including the zero value for that corner and including the other values for that corner in the direction opposite to said one direction through the order in which they appear in said first sequence; and (e) converting said values in third ordered sequence $P_2$ to respective equal-length character strings representative of the values.

4. A method according to claim 3, wherein said step (d) comprises forming said third ordered sequence $P_2$ to include said set of values $p_2$ twice in succession for the sequence $P_2$ to comprise $p_2p_2$.

5. A method according to claim 3, wherein said step (d) comprises converting said values in the third sequence $P_2$ to exponential notation.

6. A method according to claim 1, wherein said step (c) comprises converting said values in the second sequences $P_1$ to exponential notation.

7. A method according to claim 1, wherein said step (a) includes normalising the values in said first sequence by dividing each value in the sequence prior to normalization by the largest value.

8. A method according to claim 1, wherein said stop (a) comprises storing and processing said first sequence M in said computer environment as a matrix.

9. A method according to claim 1, including carrying out said steps (a) to (c) in respect of a first polygonal pattern, carrying out said steps (a) to (c) in respect of a second polygonal pattern, and comparing the converted values relating to the first pattern with the converted values relating to the second pattern by way of a computer-coded string-comparison command.

10. A method according to claim 1, including carrying out said steps (a) to (c) for a first pattern and comparing said converted values for said first pattern with predetermined values representative of a selection of further patterns by way of a computer-coded string search command.

11. A system for processing information about a polygonal pattern in the context of pattern recognition, the system comprising a computer with a central processor unit and storage means connected to the processor unit, and the system including:

(a) taking corners of the pattern in turn in order from a first of the corners through the last of the corners, forming means for forming a first ordered sequence M of values representing the respective scalar distances between each corner of the polygonal pattern and each other corner, the sequence including (i) the distances between said first of said corners and each other corner in turn and (ii) taking each other corner in turn, the distances between that other corner and each other corner starting with the first corner, and (iii) including at appropriate positions in the sequence zero values to correspond to the distance between each corner and itself;

(b) re-ordering means for re-ordering the values of said first sequence M to form a second ordered sequence $P_1$ comprising a set of values $p_1$ which includes for each corner starting with said first corner, values in a series starting with and including the zero value for that corner and including the other values for that corner in one direction through, the order in which they appear in said first sequence; and (c) converting means for converting said values in the second ordered sequence $P_1$ to respective equal-length character strings representative of the values.

12. A system according to claim 11, wherein said re-ordering means is operable for forming said second ordered sequence $P_1$ to include said set of values $p_1$ twice in succession for the sequence $P_1$ to comprise $p_1p_1$.

13. A system according to claim 11, wherein:

(d) said re-ordering means is further operable for re-ordering the values of said first sequence M to form a third ordered sequence $P_2$ comprising a set of values $p_2$ which includes, for each corner starting with the last corner, values in a series starting with and including the zero value for that corner and including the other values for that corner in the direction opposite to said one direction through the order in which they appear in said first sequence; and (e) said converting means is further operable for converting said values in the third ordered sequence $P_2$ to respective equal-length character strings representative of the values.

14. A system according to claim 13, wherein said re-ordering means is operable for forming said third ordered sequence $P_2$ to include said set of values $p2$ twice in succession for the sequence $P_2$ to comprise $p_2p_2$.

15. A system according to claim 13, wherein said converting means is operable for converting said values in the third sequence $P_2$ to exponential notation.

16. A system according to claim 11, wherein said converting means is operable for converting said values in the second sequence $P_1$ to exponential notation.

17. A system according to claim 11, wherein said forming means is operable for normalising the values in said first sequence by dividing each value in the sequence prior to normalization by the largest value.

18. A system according to claim 11, wherein said forming means is operable for storing and processing said first sequence M in said computer environment as a matrix.

19. A system according to claim 11, wherein the forming means, re-ordering means and converting means are operable together for forming string values representative of a first polygonal pattern, and then for forming string values representative of a second polygonal pattern, and wherein said system further comprises comparing the converted values relating to the first pattern with the converted values relating to the second pattern by way of a computer-coded string-comparison command.

20. A system according to claim 11, including means for comparing said converted values for said pattern with predetermined values representative of a selection of further patterns by way of a computer-coded string search command.

21. A computer program product comprising a body of computer code embodied in a computer medium for processing information about a polygonal pattern in the context of pattern recognition in a computer environment, the computer code comprising:

(a) taking corners of the pattern in turn in order from a first of the corners through the last of the corners, or first portion of said computer code for forming a first ordered sequence M of values representing the respective scalar distances between each corner of the polygonal pattern and each other corner, the sequence including (i) the distances between said first of said corners and each other corner in turn and (ii) taking each other corner in turn, the distances between that other corner and each other corner starting with the first corner, and (iii) including at appropriate positions in the sequence zero values to correspond to the distance between each corner and itself;

(b) a second portion of said computer code for re-ordering the values of said first sequence M to form a second ordered sequence $P_1$ comprising a set of values $p_2$ which includes for each corner starting with said first corner, values in a series starting with and including the zero value for that corner and including the other values for that corner in one direction through, the order in which they appear in said first sequence; and (c) a third portion of said computer code for converting said values in the second ordered sequence $P_1$ to respective equal-length character strings representative of the values.

22. A program product according to claim 21, wherein said second code portion is operable for forming said second ordered sequence $P_1$ to include said set of values $p_1$ twice in succession for the sequence $P_1$ to comprise $p_1p_1$.

23. A program product according to claim 21, wherein:

(d) the second portion of said code is operable for re-ordering the values of said first sequence M to form a third ordered sequence $P_2$ comprising a set of values $p_2$ which includes, for each corner starting with the last corner, values in a series starting with and including the zero value for that corner and including the other values for that corner in the direction opposite to said one direction through the order in which they appear in said first sequence; and (e) the third portion of said code is operable for converting said values in the third ordered sequence $P_2$ to respective equal-length character strings representative of the values.

24. A program product according to claim 23, wherein said second portion of said code is operable for forming said third ordered sequence $P_2$ to include said set of values $p_2$ twice in succession for the sequence $P_2$ to comprise $p_2\ p_2$.

25. A program product according to claim 23, wherein said third portion of computer code is operable for converting said values in the third sequence $P_2$ to exponential notation.

26. A program product according to claim 21, wherein said third portion of computer code is operable for converting said values in the second sequence $P_1$ to exponential notation.

27. A program product according to claim 21, wherein said first portion of computer code is operable for normalising the values in said first sequence by dividing each value by the largest value in the sequence prior to normalization.

28. A program product according to claim 21, wherein said first portion of computer code is operable for storing and processing said first sequence M in said computer environment as a matrix.

29. A program product according to claim 21, wherein said portions of computer code are operable together for forming a character-strings representative of a first polygon pattern and a character-string representative of a second polygonal pattern and the computer code comprises a fourth portion operable for comparing the converted values relating to the first pattern with the converted values relating to the second pattern by way of a computer-coded string-comparison command.

30. A program product according to claim 21, including a fourth program portion for comparing said converted values for said pattern with predetermined values representative of a selection of further patterns by way of a computer-coded string search command.

* * * * *